2,716,118
Patented Aug. 23, 1955

2,716,118
PROCESS OF PRODUCING VINYLPYRIDINES

Francis E. Cislak, Indianapolis, Ind., assignor to Reilly Tar & Chemical Corporation, Indianapolis, Ind., a corporation of Indiana No Drawing. Application November 15, 1948,
Serial No. 60,181

1 Claim. (Cl. 260—290)

My present invention relates to a process of preparing vinylpyridines, especially 2-vinylpyridine and 4-vinylpyridine, from the corresponding ethylpyridines.

This application is a continuation-in-part of my copending application, Serial No. 514,970, filed December 20, 1943.

Vinylpyridines, especially 2-vinylpyridine, are important articles of commerce. Commercially the 2-vinylpyridine is made by eliminating water from 2-ethanolpyridine. The chemical literature indicates that vinylpyridine also may be obtained from beta-bromo-2-pyridine propionic acid by the elimination of $CO_2$ and HBr. In 1887 Ladenburg is said to have prepared 2-vinylpyridine by reacting ethylene and pyridine; while no details of his process are available, the report does state that the yield is not satisfactory and that only a relatively small amount of vinylpyridine was obtained; so small was the amount obtained that it was not sufficient for a complete purification.

It has occurred to me that vinylpyridine might be prepared from ethylpyridine by vapor phase dehydrogenation. The theoretical considerations indicate that it would be most unlikely for the ethylpyridine to be dehydrogenated to vinylpyridine. The chemical behavior of pyridine is strongly dominated by the nitrogen atom in the molecule. Furthermore, the properties of the alkyl pyridines are dominated by the position of the alkyl groups relative to the C=N bond in the ring. Because of the strong negative polarity of the nitrogen atom and its consequent attraction for the positive hydrogen on the alpha carbon atom of the ethyl group, it would be most unexpected that vinylpyridine could be formed under conditions which would not either rupture the pyridine ring or completely polymerize the vinylpyridine if it were formed.

I have found, contrary to what might be expected, that I can prepare vinylpyridine efficiently and economically by the vapor phase dehydrogenation of the corresponding ethyl pyridines.

I prefer to carry out my invention in continuous process, although that is not necessary.

In carrying out my invention I pass the vapor of the ethylpyridine—preferably mixed with an inert gas, such as carbon dioxide or nitrogen, although that is not necessary—through a suitable reaction vessel, while maintaining dehydrogenation temperatures.

A suitable reaction vessel is a stainless steel tube. The tube may, if desired, be packed with a contact mass, but that is not necessary; the contact mass may be small granules of silica or the like, desirably between sand-grain size and pea size, and if desired may be coated or impregnated with a dehydrogenation catalyst.

Among the dehydrogenation catalysts which are effective are the oxides of the metals of the groups IV, V, and VI of the periodic system, either singly or mixed with one another. The catalytic effect of these oxides may be varied by the addition of other oxides, such, for instance, as an oxide of manganese, iron, cobalt, or nickel.

Because it makes it easier to control the reaction, I prefer to mix the ethylpyridine with an inert gas, such as carbon dioxide, nitrogen, or flue gas, before passing it in vapor phase through the reaction tube. I need not, however, mix the vapors with an inert gas; for the ethylpyridine may be mixed with air, or it need not be mixed with anything.

The dehydrogenation temperature is an elevated one, in comparison with room temperature, and is preferably in the range of 500° C. to 800° C., and desirably about 700° C.

I have found one excellent dehydrogenation catalyst to be a tungstic oxide catalyst prepared as follows:

Thirty grams of 85% tungstic acid (C. P.) is dissolved in 250 cc. of hot 6% aqueous ammonium hydroxide. This hot solution is sprayed onto 250 cc. of small granules of silica, desirably between sand-grain size and pea size, which are heated well above 100° C., thus coating the granules. After the spraying, the coated granules are calcined in air at about 400° C.–500° C. for several hours.

I have found another excellent catalyst to be a vanadium pentoxide catalyst prepared as follows:

A hot aqueous suspension of ammonium vanadate is sprayed onto small granules of silica, desirably between sand-grain size and pea size, which are heated well above 100° C. After the spraying, the coated granules are calcined in air at about 400° C. for several hours.

A ceric oxide catalyst prepared as follows was also found to be an excellent catalyst:

Twenty grams of ceric sulfate (anhydrous) is dissolved in 150 cc. of hot water. This hot solution is sprayed onto 100 cc. of small granules of silica, desirably between sand-grain size and pea size, which are heated well above 100° C., thus coating the granules. After the spraying, the coated granules are calcined in air at about 400° C.–500° C. for several hours.

The coated and calcined granules, of any of these materials, are placed in steel tubes in which the dehydrogenation reaction is to take place.

Example 1

I vaporize 2-ethylpyridine, mix it with about ¼ to ½ its volume of carbon dioxide, and heat (either before or after the mixing) to about 450° C. This hot mixture of 2-ethylpyridine and carbon dioxide is passed over the ceric oxide catalyst described above at a space velocity of about 200–500, with the catalyst and the mixture of gases maintained at about 700° C. in any suitable manner. (By space velocity I mean the total volume of gas, measured at standard temperature and pressure, which passes through the tube per hour, divided by the volume of the catalyst.) Dehydrogenation occurs as the mixture of 2-ethylpyridine and carbon dioxide passes over the catalyst, to convert some of the 2-ethylpyridine to 2-vinylpyridine. The vapors of 2-vinylpyridine and unchanged 2-ethylpyridine are condensed.

Because the boiling points of 2-vinylpyridine (160° C.) and the unchanged 2-ethylpyridine (148.8° C.) are so close together, pure 2-vinylpyridine cannot be obtained from the mixture by ordinary distillation, not even by repeated fractional distillations. In order to obtain the pure 2-vinylpyridine, it is necessary that the mixture of 2-vinylpyridine and 2-ethylpyridine be fractionally distilled through a highly efficient fractionating column having a great number of plates.

The yield of 2-vinylpyridine, based on 2-ethylpyridine consumed, is about 75%–90%.

Example 2

The procedure of Example 1 is repeated, save that in place of the 2-ethylpyridine I use 4-ethylpyridine, and form 4-vinylpyridine.

Example 3

The procedure of Example 1 and Example 2 is repeated, save that in place of the ceric oxide catalyst I use a tungstic oxide catalyst prepared as described above.

Example 4

The procedure of Example 1 or Example 2 is repeated, save that in place of ceric oxide catalyst I place in the reaction tube small granules of uncoated silica. The amount of carbon dioxide mixed with the ethylpyridine is desirably about an equal volume; the temperature is desirably about 650° C. to 750° C.; and the space velocity is about the same as in Example 1 or Example 2.

Example 5

I vaporize 2-ethylpyridine, mix it with about an equal volume of carbon dioxide or nitrogen, and heat (either before or after the mixing) to about 500° C. This hot mixture of 2-ethylpyridine and carbon dioxide or nitrogen is passed through an empty stainless-steel or steel tube at a space velocity of about 100–200, with the tube and the mixture of gases maintained at about 700° C. in any suitable manner. (In this example by space velocity I mean the total volume of gas, measured at standard temperature and pressure, which passes through the tube per hour, divided by the volume of the tube.) As the mixture of gases passes through the tube, some of the 2-ethylpyridine is dehydrogenated to produce 2-vinylpyridine.

The 2-vinylpyridine and unchanged 2-ethylpyridine vapors are condensed and the 2-vinylpyridine is separated from the unchanged ethylpyridine by fractional distillation through a highly efficient fractionating column having a great number of plates.

I claim as my invention:

A process for producing vinylpyridine which comprises passing the vapors of an ethylpyridine over a solid dehydrogenation catalyst at a temperature of about 700° C. to produce a vinylpyridine and recovering the vinylpyridine thus produced.

References Cited in the file of this patent

UNITED STATES PATENTS

| | | |
|---|---|---|
| 2,141,611 | Malishev | Dec. 27, 1938 |
| 2,259,723 | Ballard | Oct. 21, 1941 |
| 2,300,971 | Roberts | Nov. 3, 1942 |
| 2,376,532 | Egloff | May 22, 1945 |

FOREIGN PATENTS

| | | |
|---|---|---|
| 115,967 | Australia | Sept. 30, 1942 |

OTHER REFERENCES

Degering, Outline of Org. Chem., pp. 628 and 629, 1945.

Sidgwick, Org. Chem. of Nitrogen, 1942, pp. 516 and 517.

Berichte der deut. Chemie, vol. 20 (1887), p. 1643.